United States Patent [19]

Brandlein et al.

[11] Patent Number: 4,737,376

[45] Date of Patent: Apr. 12, 1988

[54] COFFEE ROASTING METHOD

[75] Inventors: Lawrence S. Brandlein, Englishtown; Steven M. Schechter, Manalpan; James P. Mahlmann, Princeton Junction, all of N.J.

[73] Assignee: General Foods Corporation, White Plains, N.Y.

[21] Appl. No.: 894,515

[22] Filed: Aug. 6, 1986

Related U.S. Application Data

[63] Continuation of Ser. No. 696,613, Jan. 29, 1985, abandoned.

[51] Int. Cl.$^4$ .............................................. A23F 5/04
[52] U.S. Cl. .................................. 426/467; 426/466; 426/595
[58] Field of Search ...................... 426/595, 467, 466

[56] References Cited

U.S. PATENT DOCUMENTS 4,489,506 12/1984 Brown et al. ...................... 34/57 A
4,501,761 2/1985 Mahlmann et al. .................. 426/467

FOREIGN PATENT DOCUMENTS 0063486 10/1982 European Pat. Off. .
132877A 2/1985 European Pat. Off. .
84/01271 4/1984 PCT Int'l Appl. .

*Primary Examiner*—Joseph Golian
*Attorney, Agent, or Firm*—Thomas A. Marcoux; Michael J. Ouillinan; Daniel J. Donovan

[57] ABSTRACT

Coffee is produced by first suspending a bubbling bed thereof under conditions which avoid popping in a heated medium wherein the heating gas is present in excess of 10:1 gas to coffee, the gas being less than 630° F., and thereafter exposing the coffee to a further charge of hot gas at a comparable gas to coffee ratio to complete the roast, the second charge of air being at a temperature equal to or less than the first charge. The roasted coffee which is produced has a roasted whole bean density of from 0.28 to 0.34 gms./cc. When the roasted whole beans are suitably ground, a roasted and ground coffee of 11 to 13.5 oz. per 1000 cc. is produced.

28 Claims, 8 Drawing Sheets

COFFEE ROASTING METHOD

This application is a continuation, of application Ser. No. 696,613, filed 01/29/85 now abandoned.

TECHNICAL FIELD

The present invention relates to a coffee roasting method and more particularly to a coffee roasting method that is quite rapid while providing the opportunity to control final product properties. The invention also relates to the product of such a roast and apparatus for performing the coffee roasting method.

BACKGROUND ART

Conventional non-fluidized bed coffee roasting equipment uses a roasting atmosphere at a temperature often exceeding 1000° F. In addition, conventional non-fluidized bed roasters typically use low weight ratios of roasting atmosphere to coffee beans (hereinafter referred to as the air to bean ratio). The combination of the high roasting temperature and the low air to bean ratio results in a temperature gradient from bean to bean as well as within the coffee bean itself. Such a temperature gradient indicates that different roasting reactions occurs at different times among the beans as well as internally in any given coffee bean.

Fluidized bed roasting of coffee beans is well established in the art. For example, U.S. Pat. No. 4,169,164 to Hubbard et al. describes a two-stage fluidized bed roasting process wherein the temperature in the first stage is 450° to 470° F., while in the second stage roasting is at about 540° F. with a fluidized bed depth of about 2 inches. A similar process is disclosed in U.S. Pat. No. 4,322,447 to Hubbard wherein the temperature in both stages is between 550° and 570° F. The apparatus contemplated for use in both disclosures is a fluidized bed wherein heated gas is directed downwardly through jets onto a vibrating gas-impervious plate which gas is then deflected upward, thereby fluidizing and roasting the coffee beans. The apparatus is more fully described in U.S. Pat. No. 3,229,377 to Hoyt. Numerous modifications of the apparatus are disclosed in U.S. Pat. Nos. 3,262,217; 4,109,394; 4,169,322; 4,201,499 and 4,306,359.

Other apparatus for the fluidized bed roasting of coffee are U.S. Pat. No. 3,964,175 to Sivitz which in turn contains an extensive survey of prior art attempts at fluidized bed roasting.

PCT Published International Application No. PCT/US 83/01521 (International Publication No. WO 84/01271) in the names of Brown et al. describes a modest laboratory scale apparatus and method for roasting coffee beans in less than 3 minutes. The process teaches charging green coffee beans to be roasted in a roasting chamber, flowing fluid through an inlet tube for discharge as a high velocity column against the base of the chamber and deflection radially outward for upward flow at lower velocity. The high velocity column of fluid produces a fluidization and toroidal recirculation of the coffee beans in the roasting chamber. The combination of the thermal convection and thermal conduction between individual coffee beans in the roasting chamber provides a short time uniform roast.

It is an object of the present invention to provide coffee roasting methods which are commercial and transcend all of the foregoing processes in permitting the roast to occur in less than 3 minutes while at the same time producing quite acceptable coffee.

It is another object to the present invention to provide a roasting method which produces a less dense coffee having perceived flavor and strengths and soluble solids yield significantly greater than those of conventionally roasted coffee of equivalent quality. Indeed the roaster yield of the coffee is increased significantly, the term yield referring to the pounds of roast material obtained per pound of green coffee.

It is a specific object of the present invention to provide a method for continuously roasting coffee in a manner wherein the residence time within the roaster is precisely controlled and is much less than 3 minutes and more commonly has a total roasting time of less than 2 and advantageously less than 1.5 minutes.

Still another specific objective is the ability to roast coffee by first elevating the charge of coffee with a preferred air temperature of at least 500° F., depending upon the air-to-bean ratio, the bean type and the product so desired, whereafter a second roasting occurs generally at an equal or reduced temperature which may broadly be said to be 150° F. or less depending upon bean variety and blend as well as feed rate, residence time, air flow and the air temperature of the first zone.

Still other specific objectives of the present invention are to provide a continuous roasting apparatus to meet the objectives of the invention including means whereby the bed of coffee may be adjusted for receipt of the roasting gas.

Still another specific object of the present invention is to provide a coffee of acceptable flavor and color and having a roasted whole bean density of 0.34 grams per cc or less and typically in the range of between 0.280 and 0.335 grams per cc.

DISCLOSURE OF THE INVENTION

A method for continuously roasting coffee in a manner wherein the roaster heating of the coffee is precisely controlled by the mechanical design of a solid screw which insures positive flow and is broadly less than 3 minutes has now been invented. In the first step, green coffee beans are fed into the feed end of a first, longitudinally extending roasting chamber which includes a first cylindrical foraminous container which rotates within a roasting chamber and a first helical screw member attached to and rotatable with the container. The screw member has a diameter equal to that of the container and is effective to convey the coffee beans through the roasting chamber at a precise rate, the coffee beans being fed into the container at a rate such that the "static" (packed) bed entering it is substantially less than 25% of the diameter of the container.

The beans are partially roasted within the container for from 0.25 to 1.5 minutes during which they are subjected to a flow of heated gas which passes upwardly through the first foraminous container at a mass flow rate of at least 10 pounds of gas per pound of beans and such that the hot gas eventually causes an expansion of the advancing bean bed and partial flavor development. The depth of the expanded bed is at all times less than 50% of the diameter of the foraminous container. The hot gas temperature ranges upwardly from 500° F. but is generally less than 630° F. As a result, the beans are partially fluidized, partially dried and partially expanded but do not pop. The coffee beans increase in their activity as they approach the terminal phase of the first partial roast to a point whereat the beans are in a bubbling bed but do not exceed 400° F. bean temperature; in terms of a temperature range, partially roasting coffees in the 300°–375° F. range are common; the more preferred range being above 330° F. for one minute or less.

The beans are then passed from the discharge end of the first roasting chamber into the feed end of a second longitudinally extended roasting chamber like the first. The first and second roasting chambers are sealed together in a manner which prevents substantial escape of heated gas and beans therefrom. The beans are conveyed through the second roasting chamber by means of a second rotating cylindrical foraminous container and a second helical screw member like the first. The coffee beans reside in the second roasting chamber for from 0.25 to 2 minutes, commonly less than 1.5 minutes, while the beans are being subjected to a flow of heated gas which passes upwardly through the second foraminous container at a temperature equal to or less than that of the gas entering the first rotating chamber. The beans are vigorously bubbled in the second roasting chamber along the length thereof by gas at a mass flow rate of at least 10 pounds of gas per pound of beans and commonly at least until the beans "pop" and have the requisite flavor and color developed therein.

Thereafter, the beans are passed from the discharge end of the second roasting chamber into a zone where they are quenched with water and/or air, commonly both.

It is a distinctive feature of the present invention that the total roasting time in the first and second zone combined may advantageously be less than 3 minutes and indeed in the desired processing from the standpoint of density reduction and flavor strength the total roasting time should be less than 2.0 minutes, commonly less than 1.5 minutes total, a dramatic reduction in the elapsed time of heating coffee to produce coffee flavor.

It is a distinct feature in this invention and one to be contrasted from prior art that the temperature of the gas entering the second roasting chamber will be equal or less than that entering the first roasting chamber, the temperature differential between roasting zones being dependent upon the bean variety. Thus, where the coffee being roasted is principally either Robusta or Santos, the temperature in the second roasting chamber will typically be 25° to 125° F. less than that in the first roasting chamber. In the case of Milds or a blend principally containing Milds, the second gas temperature in the second roasting chamber will be 0° to 75° F. less than that in the first chamber. Although the present invention has its widest application in the roasting of individual coffees strains which are thereafter blended, and thus may be characterized as single bean variety roasts, the invention is applicable also to the roasting of blend varieties, that is, blends wherein the coffee strains have been mixed prior to roasting rather than after.

The coffee in the first and second chambers is subjected to a total mass flow rate of 20 to 60 pounds of gas (preferably heated air) per pound of green bean, the flow rate for each zone being dependent upon the overall length of the first and second roasting cycle.

The first and second chambers will have a foraminous roasting cyclinder in each zone adapted to receive upwardly-directed heating air creating a novel bubbling action throughout wherein the coffee is only partly fluidized and partly non-fluidized as it advances.

The flow rate will be such that it will be advantageous that the discharged roasted coffee will next have a water quench and thereafter it will be promptly fed to an air quench; although this is not critical, it is desired that the water quench be promptly employed for the limited period so that controlled predictable conditions may arise.

The coffee exiting the second heating zone will have a whole bean density whether or not quenched which is very significantly reduced and typically that density range will be between 0.280 and 0.340 grams per cc.

In practicing the present invention, the bean chagrge in the first heating zone of the roaster never exceeds the point whereat expansion to the extent of a "pop" is experienced, but it generally does reach a bean temperature exceeding 330° F. but not exceeding 375° F. as indicated. The bean charge entering directly into the second roasting zone will be at a bean temperature typically no less than 15° F. below the temperature leaving the first roaster. The beam charge will be heated, in the second roaster to a temperature that exceeds 360° F. in any event but is less than 480° F., a common range being 365°–450° F. As a result, controlled pyrolysis occurs in the second roasting chamber generating coffee flavor, color as well as bean expansion.

The roasted coffee particulate matter including roasted chaff will be collected at the discharge end of the second roasting chamber and will be recombined with the roasted coffee as will be discussed hereinafter.

The total roasting time from the point of entry to the first roaster to the point of discharge from the second roaster will advantageously be less than 2 minutes and provides a distinct product in terms of lower density and higher flavor strength.

BEST MODE FOR CARRYING OUT THE INVENTION

As the description herein will develop, it becomes apparent that in practicing the present invention it is possible to roast coffee in a period of 2 minutes or less and to achieve such a roast at a high volume, typically 5,000 to 12,000 lbs. per hour of green coffee, it being recognized that lower volumes are practical as well.

While not being restricted to any theory, it is believed a relatively short span of time is devoted to heat treatment and reaction of moisture, and yet that moisture promotes additional hydrolysis and participates advantageously in the roasting process. This is achieved by having the bean temperature rise rapidly and thus retain a high internal bean moisture during roasting. As a result, the roasted coffee bean is more pliable during roasting thereby allowing for greater expansion of the coffee. It is desired to achieve these conditions under controllable circumstances whereby, on the one hand the coffee will not undergo a charring, and on the other hand will not undergo incomplete and non-uniform roasting.

It will commonly occur that the beans will be heated rapidly and uniformly to a bean temperature of approximately 420° F., the so called "glass-transition temperature" of a coffee bean. Glass transition temperature as defined in polymer chemistry is that temperature at which a polymer loses it crystal structure, softens and becomes like glass. The coffee bean is known to be comprised of a large portion of crystalline carbohydrates such as mannan and cellulose. When this temperature is reached, the carbohydrates contained in the bean have been softened and lose their crystal structure. Internal pressure produced by gas is generated during roasting and causes the softened mannan and cellulose within the bean to expand, opening-up the bean to roasting and providing the density decrease that is one of the primary objects of the present invention. The polymers (in this case mannan and cellulose) soften and the internal bean pressure causes markedly different rates of expansion, approaching vertical in the terminal stages of roast in a plot of time versus temperature on an expansion curve; such expansion typically occurs between about 410° and 420° F. bean temperature as measured by thermal mechanical analysis; ref. Perkin Elmer Thermomechanical Analysis, 1977. In a good many roasts this latter temperature will be exceeded for a short period, but generally less than 30 seconds.

Thus, puffing of the once green bean and hydrolysis of solids therein occurs in the first zone in the presence of a large mass of heated air, followed by further expansion of the roasted bean in the second zone which may be at and may eventually exceed the glass transition temperature, the latter expansion being typically for a short period of much less than a minute. In the present process thers is contemplated an endless screw rotating horizontally within and as part of a cylinder. These conditions pertain generally when the gas temperatures in the first zone as contemplated in said apparatus are preferably 500° to 630° F., more particularly 560°–610° F. followed by an equal or lower temperature in the second zone, more commonly at a lower air temperature ranging anywhere from 460° to 570° F. Bean type, bean quality and moisture will vary and accordingly there will be a variance in the second zone temperature; however, it is generally the case that these temperatures will exceed 460° F. and range upwardly to 570° F.

The atmosphere in which this roasting is effective can be described as a bubbling bed, that is, one which is intermediate a static non-fluidized bed wherein essentially none of the beans are suspended in the roasting atmosphere and a fluidized bed wherein substantially all of the beans are suspended in the roasting atmosphere. A bubbling bed as used herein is one in which the greater mass of coffee beans is eventually suspended, that is, 50% or more by weight by visual approximation. Typically, in the initial stage or first zone the bubbling bed constitutes a minimum of say 20% beans fluidized; as the beans are advanced in this chamber the extent of bean fluidization will increase to a point whereat the coffee will be approximately 40% or more, say 50% fluidized. Thereafter, the coffee will undergo further fluidization in the second zone to the extent that, by the end of roasting, the coffee will have experienced at least 50% fluidization and commonly in the neighborhood of 70%–80%. The degree of fluidization is to some degree dependent upon the bean type as well as the degree of roasting required for the final product. In addition, the volume and coffee to the apparatus will all determine the extent to which the bubbling will be manifested. Nevertheless, it is foreseen at the present time that at less than 20:1 gas to bean ratio for the entire roasting operation there will be insufficient mixing, thereby generating non-unform roasting, higher density, longer roast time and generally an unacceptable roasting condition.

The bubbling bed may be characterized as a recycling one wherein a good portion of the beans are in contact with the heating air stream therebeneath. As a result, the effecting air-to-bean ratio for the beans that are in the fluidized state per se, will exceed the total gas-to-bean ratio aforesaid by as much as 2-4 to 1. The rate of this recycling increases as the coffee charge moves through the roasting zones. The recycling pattern causes the beans to receive heat energy through alternating mechanisms of convection and conduction thereby allowing an effective transfer of heat energy. This affords two means of heat transfer to occur continuously throughout the roasting process, convection heating becoming progressively more dominant as the means of heat transfer. Conductive heating occurs throughout at the lateral extremities of the coffee bed, however, and provides predictable and controllable energy transport. A uniform roasting is thus realized throughout where the external history of the roasts of each bean is substantially the same, including the popping region and the region thereafter where flavor is fully developed. The amplitude of the height of bean fluidization increases along the length of the bed and will be at least two to threefold the height of the static bed as the coffee is roasted and tumbled, but the bed is never more than 50% of the diameter of the roasting cylinder.

It should be noted therefore that the bean charge at no time is 100% fluidized and a quantity of beans, at all times along the length of the roaster, will be non-fluidized and in contact with other beans as well as with the heated cylinder.

Generally speaking and in greater detail the charge of coffee in a quiescent state, i.e., without the introduction of an air mass thereto, will be less than 5 inches no matter what the practical outer diameter of the foraminous cylindrical container-helical screw might be. To illustrate, however, for a 43 inch diameter foraminous container the initial bed depth may range between $\frac{1}{2}$ and $2\frac{1}{2}$ inches typically 2 inches in a quiescent condition. The length of the helical screws can vary and range anywhere from 6 ft. to 50 ft.; a common length will typically be in the neighborhood of 25 to 35 ft., say 30 ft. for a screw having a 2 inch coffee bed depth (quiescent).

As indicated, it will be preferred to have an interrupted section intermediate the first and second zone wherein the coffee will reside for a period of no more than 25 seconds and more typically 6 to as high as 18 seconds. In passage through this zone the coffee is maintained essentially at a temperature substantially equal to that in the first zone. Although it is recognized that there will be some very marginal loss of temperature in this zone, no more than 15° F. bean temperature loss will exist between the exit from the first and, that prior to entry to the second roasting zones.

The foregoing conditions will be understood to apply in the case of screws which are of the same pitch. Hence, the coffee would, normally speaking, be moved at a uniform rate through both roasting zones. On the other hand, it is quite conceivable and still within the invention that a roaster operating under the same heating conditions broadly can have a nonuniform pitch such as one wherein the charge of coffee is initially charged to a shorter screw pitch which thereafter lengthens; the same considerations apply to the second screw, the diameter of which may be greater than that of the first.

The roasted and ground final coffee weight may be typically as high as 14oz. but more commonly will be 11 to 13.5 oz. for a 1 lb. can of conventional diameter and size; for sake of reference an 11 oz. roasted and ground product of this invention occupies a volume of 1,090 cubic centimeters, a cannister of approximately 9 inches diameter and $5\frac{3}{8}$ inch height and designed to receive a conventional 16 oz. roasted and ground coffee; this reference is used throughout. This corresponds to a roasted whole bean density within the range of 0.280 to 0.340 grams per cubic centimeter. Broadly speaking, for 11 to 13½ oz. coffee, it will be found that the flavor strength and character will be comparable to that of a conventional atmospheric roast. Thus, when the 11 to 13.5 oz. coffee product of this invention is brewed, it will use the same volume of coffee but at a reduced weight as the recipe for a current 16 oz. product while offering comparable flavor, strength and quality.

It has been observed that the total volume of heated air during roasting will range anywhere from at least 20:1 and more commonly will be about 35:1, but may be as high as by volume of coffee as 60:1 along the total roaster length. It will be understood that this air to bean ratio will constitute a significant departure from prior art which has characterized coffee roasters and which generally range from 3:1 to 15:1 air-to-coffee volume for a Probat-batch or a Wolverine Jetzone type roaster, respectively.

As noted, for the conditions of common usage, the gas temperatures will be below 630° F. in the first zone. It is possible to practice this invention at higher inlet air temperatures with still shorter times in the first zone than those expressed herein while enjoying the same benefits. Such criteria as are specified for the initial roasting operation, are for the purpose of orientation relative to prior art rather than specifying an upper roast temperature in the inlet air to the first zone.

It should be noted at this point that the second zone is employed to influence color as well as flavor and density control. The flavor profile will generally be such that the coffee will be roasted to that desired for a specific blend or variety; this generally involves a lighter roast color Robusta than say the Colombian Milds or the Brazilian Santos.

Generally, the 11 to 13.5 oz. final product density reduction and greater flavor strength is achieved without significant blend or color alteration from current 16 oz. product. Expressed in terms of what the typical preferred American preparation would be, which results in a solids level of 0.7%±0.15% in the cup, and considering also the weight of coffee used in roasted and ground preparation to produce a soluble yield of approximately 25%±4%, the amount of coffee used in the preparation is reduced significantly. 11 oz. of the present roasted coffee now offers the same perceived brew flavor as 16 oz. of conventional roasted coffee at 90 to 110 cups per can in accordance with current consumer usage level; these propositions apply generally in the case of 11 to 13.5 oz. coffee.

The density measurement procedure is comparable to that of the prior art and reference may be had in this connection to U.S. Pat. No. 4,332,447 to Hubbard issued Mar. 30, 1982, column 4, lines 46-55 wherein a technique is set forth for measurement. The roasted coffee product produced will of course vary with bean variety, green character, bean moisture content as well as the distribution of bean sizes in a given variety blend and the age thereof.

Certain unique properties are believed to apply in the case of the present roasted coffees that do not apply in the case of commercially available coffee-so far as presently known. To explain, thermal degradation of the coffee cell wall as a result of roasting is distinctly different, evidencing a lesser degree of thermal degradation for the present process. A second difference is the existence of extensive hydrolysis of the coffee in the cell wall, i.e., the presence of vacuoles in the cell wall structure. To explain further, in a study of photomicrographs at say 630 diameters, prior art roasted coffee will generally comprise thermally degraded cell wall structures. But, in the case of a roast in accordance with this invention, although the cell wall surrounding individual cells will be somewhat thermally damaged and disrupted, the cell walls appear to have stretched while being substantially intact, notwithstanding that they underwent partial hydrolysis. This in part accounts for the increase in soluble solids discussed previously.

Green coffee subjected to a roast in the first stage is commonly at a moisture content of 10%±2% moisture, although the upper moisture level can be as high as 15%. It is anticipated that during the first stage substantial moisture will be lost through evaporation, usually a majority by weight or more, the coffee existing the first roasting chamber at a level of 0.5-4% moisture, more commonly, 1-2%.

The moisture content of coffee exiting the second roaster zone will be in the neighborhood of 0.5-2%. Coffee entering the water quench will undergo some increase in moisture content thereby; but, the primary function of the water quench will be to effect an arresting of the flavor development process achieved in the second zone. Thereafter, coffee may be further cooled by an air quench at say room temperature to 100° F., the moisture content thereof being uniform throughout.

As explained, the bean varieties for treatment in accordance with this invention can be blended after a roast (BAR) or blended before roast (BBR). For present Domestic/American purposes it will be advantageous to employ a BAR roast, where an individual coffee, such as Robusta varieties, is roasted to its optimal color and flavor. On the other hand, for certain non-American roasters such as Germany, it may be desired to employ a BBR procedure in which case appropriate adjustments in the conditions to achieve maximal color and flavor development will practiced, all within the skill of the calling. Robustas have come to be used to a large extent and in the main may be said to comprise a major weight percent of the preferred blend, levels of Milds coffee and/or Santos being employed to like advantage to a lesser extent and as part of a separate roast.

Robustas will be roasted in accordance with the present invention to a range in the order of 70-90 photo-volt units, whereas the Colombian Milds will be roasted in the range of 30-60 photo volt units and the Brazilian Santos in the range of 50-70 photo volts. The term photo-volts and its measurement can be derived by reference to U.S. Pat. No. 3,762,930 to Mahlmann issued Oct. 2, 1973 for Mechanical Pressure Roasting of Coffee at col. 8, commencing on line 10 et seq. It should be understood that the color range specified is for caffeinated coffees, the decaffeinated being generally lower in the range of 30-60 for all varieties.

It will be desirable that the recirculating heating medium will be controlled so that chaff generated will be effectively advanced along the length of the roaster and be buffeted upwardly upon leaving the roaster prior to entry of the coffee charge into a cooling area. This will commonly involve the use of one or more fans per section which blow and recirculate air independently of one another while at the same time providing air which not only levitates the bed but agitates it. The exhaust duct work will be located in the terminal stages of the second roasting area as indicated elsewhere.

The invention may now be more understood by reference to the accompanying drawings of one device which embodies the features thereof wherein FIG. 1 is a top plan view of the roaster and cooler and FIG. 2 is a side elevation view of the roaster and cooler.

Figure 1:
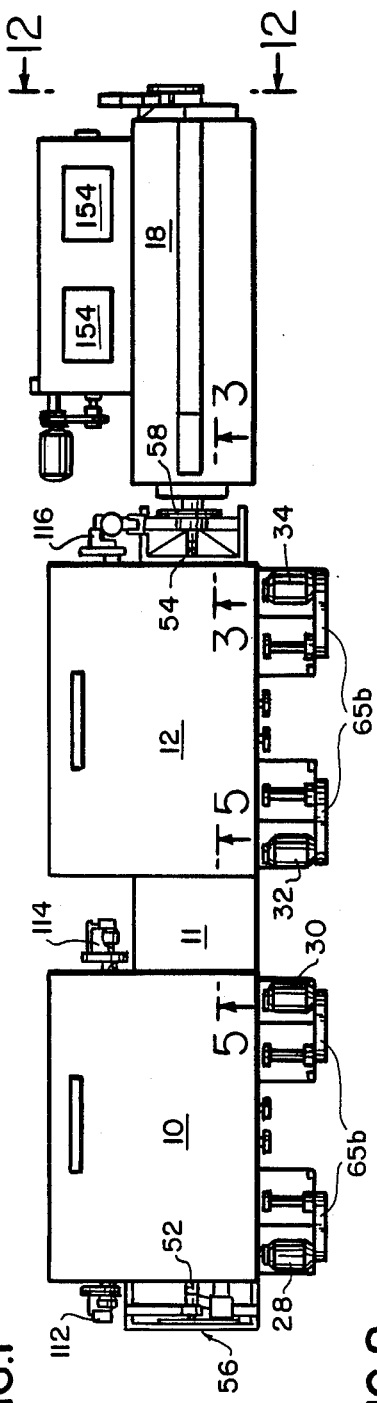
Figure 2:
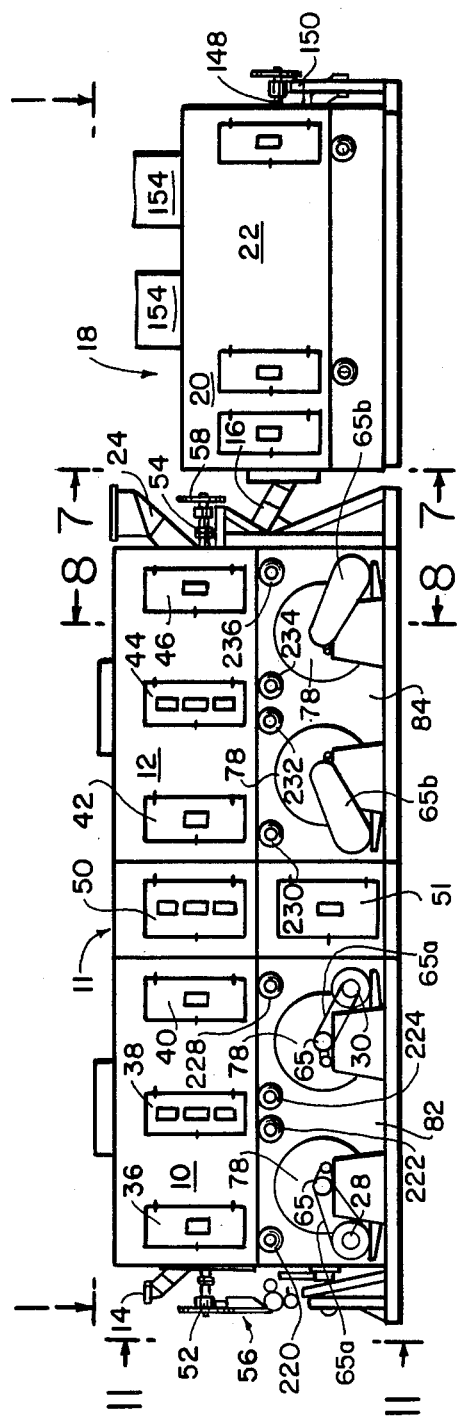
Figure 11:
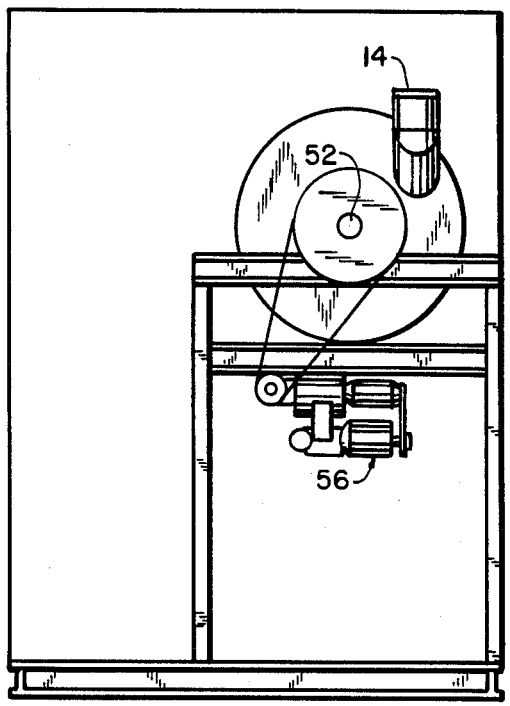
Figure 12:
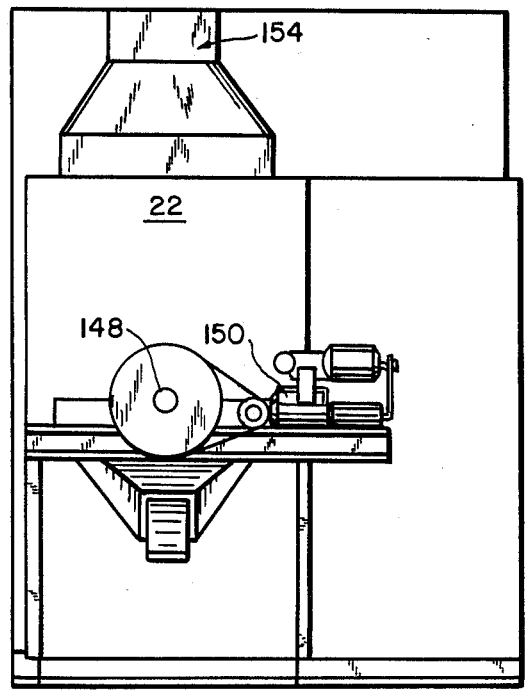

And FIGS. 11 and 12 are end views of the device taken along lines 11—11 and 12—12 in FIGS. 1 and 2.

Referring to the drawings, the roaster will be seen to comprise a first roasting zone 10 communicating with a second roasting zone 12 through the intermediation of transition zone 11. Coffee enters zone 10 through a feed hopper 14. After coffee has been roasted in zone 10 and 12, it leaves through discharge generally shown as 16 and enters the cooling zone 18 which comprises a water quench section generally shown as 20 and an air cooler section 22. Roasted coffee particulate including chaff is collected at the terminal end of zone 12 through a duct 24 after having been liberated progressively from the coffee along the lengths of zones 10 and 12.

The roasters viz. zones 10 and 12, have two fan drives for each zone; thus, fan drives 28 and 30 are horizontally mounted and constitutes the air flowing means for circulating air in the first zone 10, and fan drives 32 and 34 constitute counterparts in zone 2, the second roasting zone 12.

A plurality of doors 36, 38, 40, 42, 44 and 46, provide access to the roaster oven zones 10 and 12. At the transition zone 11 between the first and second zone 10 and 12, doors 50 and 51 are also located for access.

Figure 4:
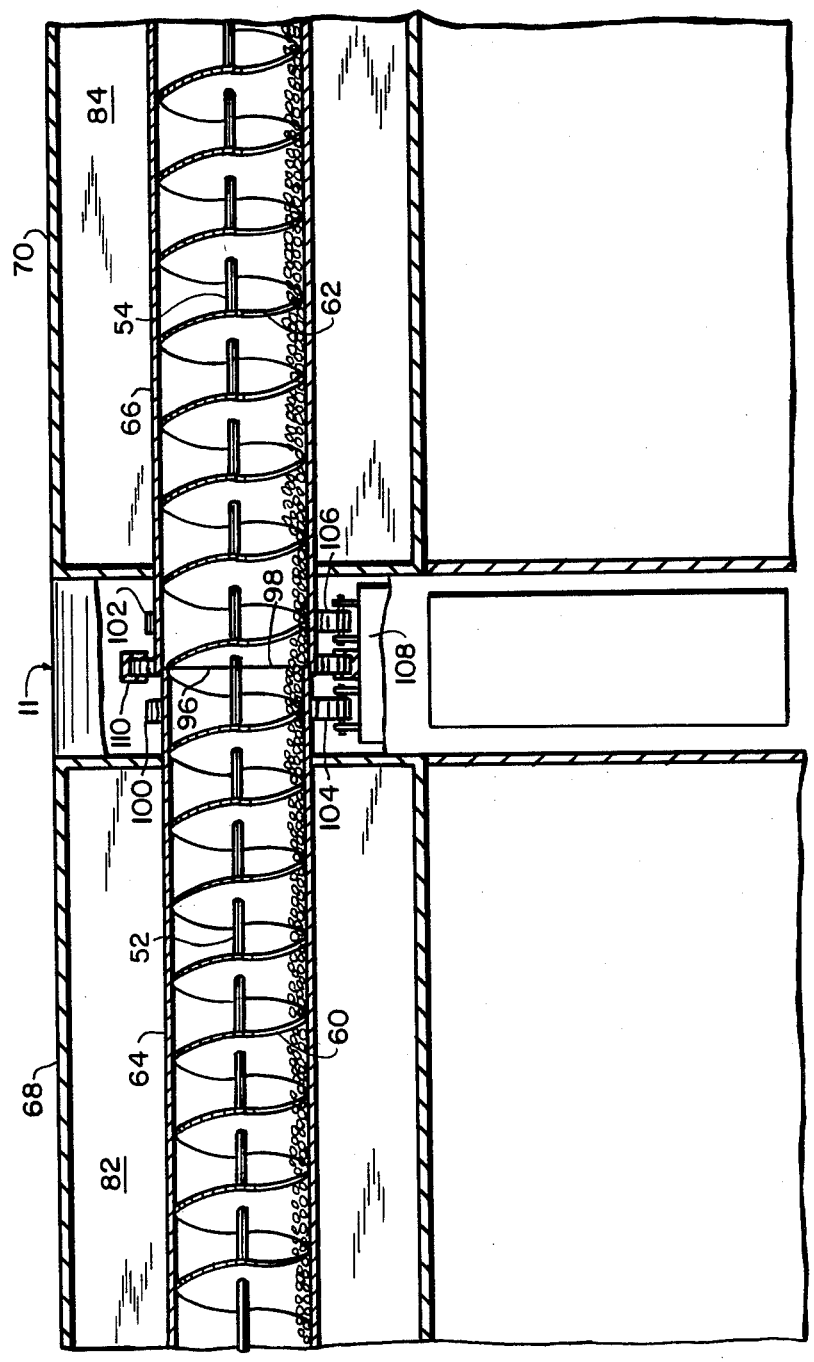
FIGS. 4 and 5 are expanded views of an intermediate section of the roaster.
Figure 8:
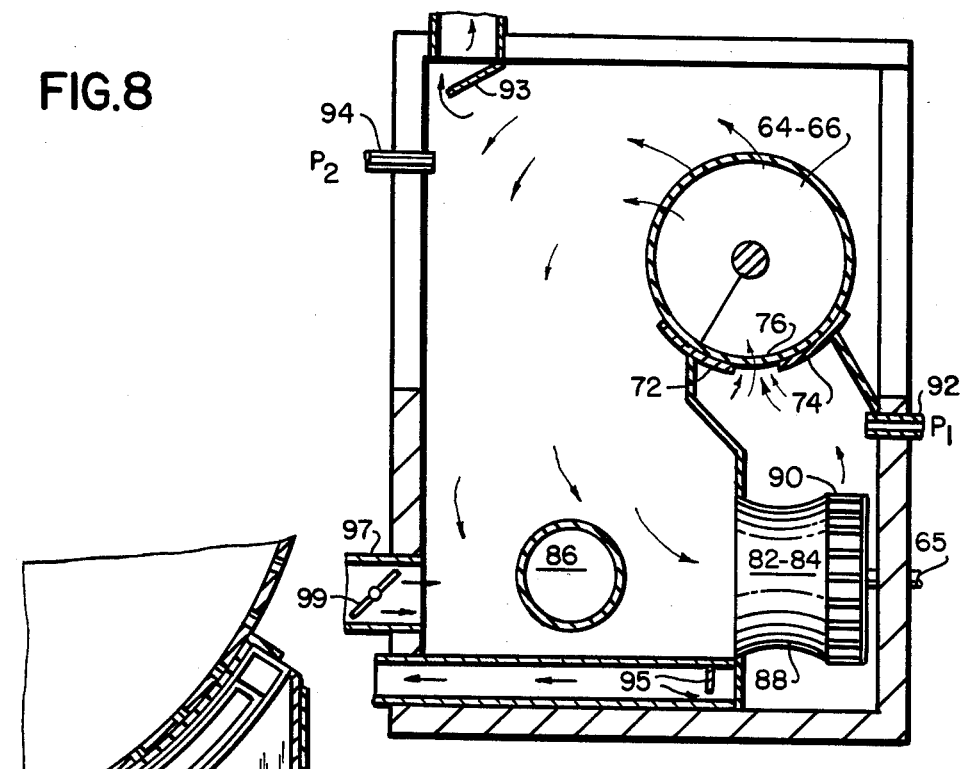
FIG. 8 is an expanded view of the heater along line 8—8 in FIG. 2.

Shafts 52 and 54 operating under the control of drive means generally shown at 56 and 58 mounted at the extremities of the first and second zone operate to drive the shafts respectively mounted for rotation within the first and second zones 10 and 12. Shafts 52 and 54 have mounted fixedly thereon respective helical screw 60 and 62 (ref. FIG. 4) for rotation with circumjacent foraminous perforated screens 64 and 66 within roasting cylinders 68 and 70. The screen perforations are approximately 1/5 the size of a green bean. Solid arcuate plates 72 and 74 (ref. FIG. 8) mounted beneath each roasting cylinder serve to control the admission of heating air directionally upwardly from below the coffee bed, as at 76, intermediate the edges of plates 72 and 74. The space between plates 72 and 74 will be adjusted by means to be hereinafter described so that the width of the area for heat admission 76 will vary in accordance with the quantity of coffee and the amount of heated air supplied.

A series of four internal fans, each generally shown as 78 (ref. FIGS. 2 and 8) and each communicating through a shaft 65 and a belt 65a under hood 65b with fan drives 28, 30, 32 and 34, respectively, are mounted within pressure boxes 82 and 84. A series of flame ports, each generally shown as 86, provides a heat source for the recirculating air which is fed through inlet ducts 88 and thence through respective fans 90 and upwardly in the direction of the roasting cylinder in zones 10 and 12, whereupon the heated air passing plates 72 and 74 at 76 surrenders heat energy to the coffee and thence passes the cylindrical foraminous screens 64, 66 of roasting cylinders 68 and 70, the fluidizing gas being redirected for reheating to the respective flame ports 86. The flame port 86 thus feeds heated air through respective inlet ducts 88 and fans 90 upwardly in the direction of the roasting cylinder, whereupon the heated air passes plates 72 and 74, surrender heat energy, and passes cylindrical foraminous screens 64 and 66 of cylinders 68 and 70, the fluidizing gas being redirected to the flame port 86 to complete circulation. Heated air passes pressure taps 92 (designated as $P_1$), one for each fan, enters the coffee roasting section through plates 72 and 74 and a corresponding number of pressure taps 94 (designated as $P_2$). By utilizing the pressures $P_1$ and $P_2$ to obtain a delta P one is able to determine the volume of air being recirculated.

A portion, say 5% by volume, of the recirculated air is exhausted through ports 93 and 95 located in each of the two roasting zones and are installed along the entire length of each zone. The purpose of the upper port 93 is to remove air which contains volatiles released during the roasting process. The exhausted air also contains unburnt combustibles and byproducts of combustion released by the flame ports 86. The purpose of the lower port 95, known as the sweep exhaust, is to remove coffee particulate matter released through the holes in the foraminous cylinders. Exhausting air containing volatiles/unburnt combustibles along with particulate coffee matter prevents the accumulation of these flammable materials within the roasting chambers and provides a safe roasting atmosphere. The exhausted air and coffee particulates after leaving the roasting chamber are passed through recovery equipment (not shown). Presently, the recovered partially roasted coffee particulate is used as a source of fuel in boiler operations. The recovered coffee particulate could also be thought to represent a source of partially roasted coffee solids for other processing applications.

Shown in FIG. 8 is an air intake damper 97. There are two of these intake dampers in each of the two roasting zones. The damper consists of a metal shell and adjusting vane 99 whose purpose is to regulate the amount of air which passes through the damper. The intake damper provides a path for ambient air to enter the roasting chamber. This ambient air is allowed to enter the roasting chamber so as to replace air exhausted through ports 93, 95 and thus preserve the air balance with the chamber.

Figure 5:
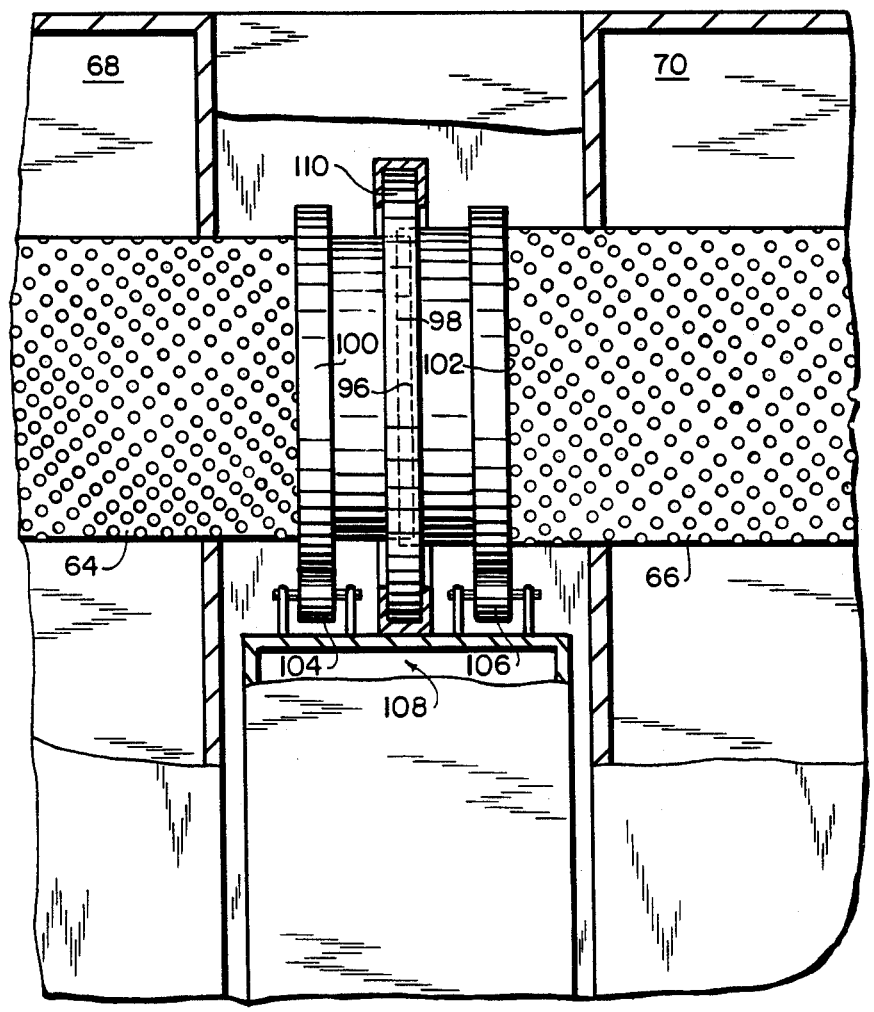

Referring to FIGS. 4 and 5, the intermediate transition zone 11 is employed to prevent coffee material from exiting the roasters' foraminous cylindrical screens 64 and 66 at the point of their joinder 96-98. Zone 11 comprises a pair of trunnions 100, 102 located on the ends of the cylindrical screens 64 and 66. The trunnions 100, 102 bear respectively on support bearings 104, 106 mounted on framework 108 for supporting the free ends of the foraminous cylinders 64 and 66. An air seal 110 surrounds the ends of cylinders 64 and 66 and communicates with a fan located external to the roaster housing, whereby pressurized air passes into the air seal 110 to create a pneumatic seal at the junctures 96 and 98 of the cylinders. In this manner, a very small gap is maintained in order that the roasting cylinders 64 and 66 may be independently rotatable while being sealed to prevent coffee material from escaping the cylinders through the gap therebetween.

It will be noted that there are two burner sections for zone 1, generally 112 and 114 (FIG. 1) operating independently, the heating sections being operated to maintain a substantially constant gas temperature for the passage of coffee across zone 1. Essentially the same heating principle is employed for zone 2 except that it has but one heat source 116 serving to pass heated air through energizing zone 2 throughout. In this way a generally lower temperature air (heating gas) is blown by drives 32 and 34 for zone 2 than the air (heating gas) blown by drives 28 and 30 for zone 1.

Figure 3:
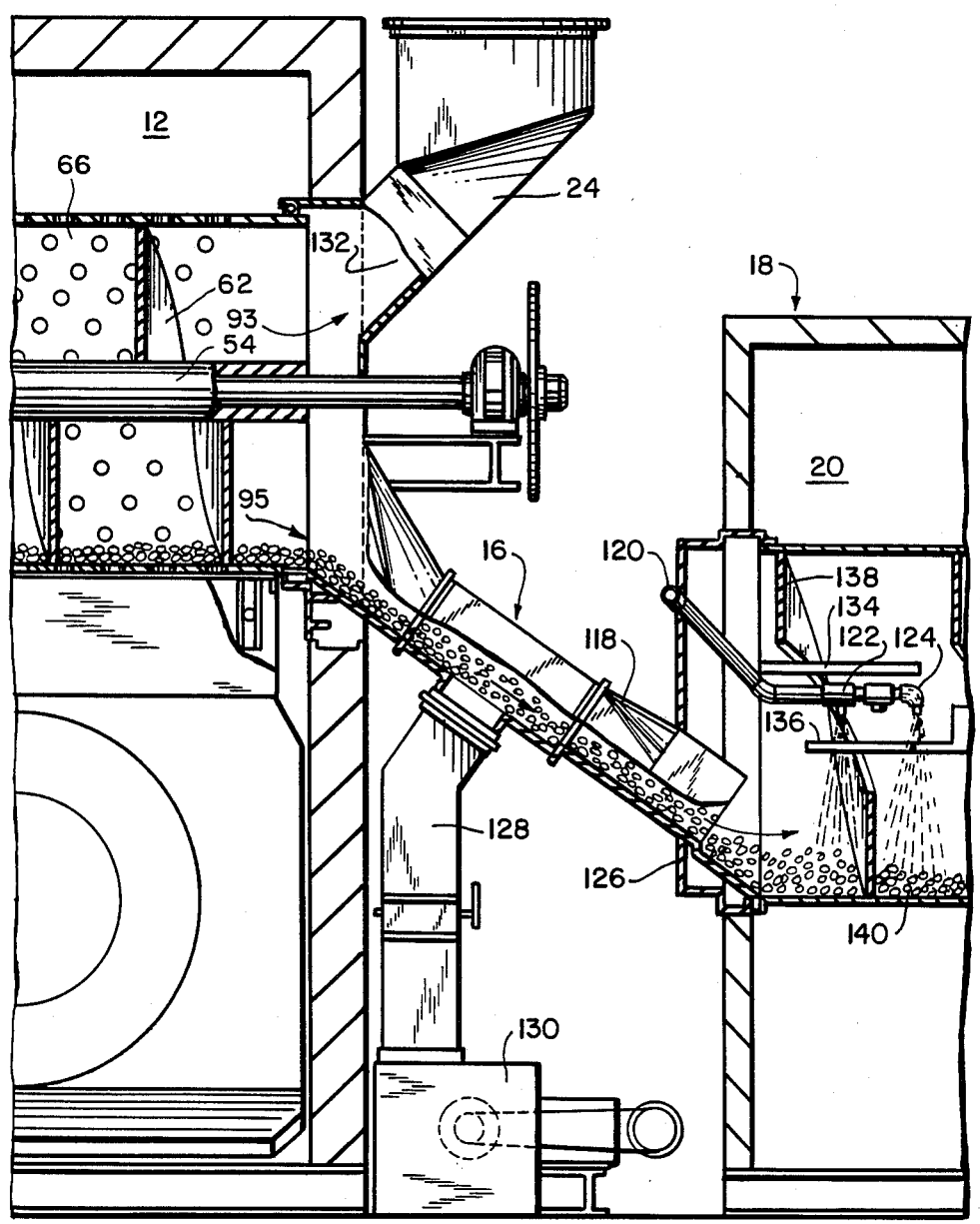
FIG. 3 is an expanded side elevation of portions of the roaster and cooler along line 3—3 in FIG. 1.

Referring to FIG. 3, discharge chute 16 includes a port 118 which feeds water quench section 20. Pipe 120 sprays water through jets 122, 124 onto the bed of coffee deposited in the zone defined by the endwall 126 of quench chamber 20 and a transverse partition in the quench section 20.

The chaff separating arrangement 24 generally comprises a vertical duct 128 which passes air under the control of fan means 130 upwardly through the descending roasted coffee beans in 16 until it merges with roasted chaff and exits with the chaff through a duct 132 to chaff recovery equipment (not shown). Thus, roasted chaff within cylinders 68 and 70 is removed under the influence of an air flow within the cylinders and courses through zones 1 and 2 respectively for removal through the duct 132.

Bars shown at 134, 136 mounted on the walls of the water quench section act to assure uniform distribution of the water spray emanating from jet nozzles 122 and 124, the bars serving to uniformly mix the coffee and the quench water. As the coffee is advanced in the water-quench zone by helical vanes 138, it eventually reaches the air cooler section 22. Quench section 20 includes a solid rotatable cylindrical wall 140 and vanes 138 fixedly mounted therewithin to cool coffee.

Figure 6:
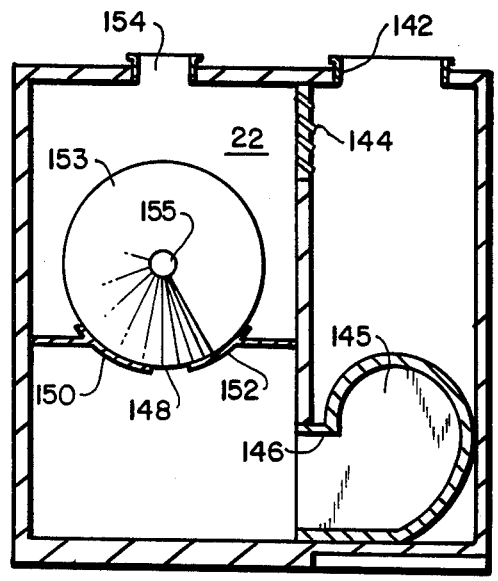
FIG. 6 is an expanded view of the intermediate zone of the cooling unit of the roaster.
Figure 7:
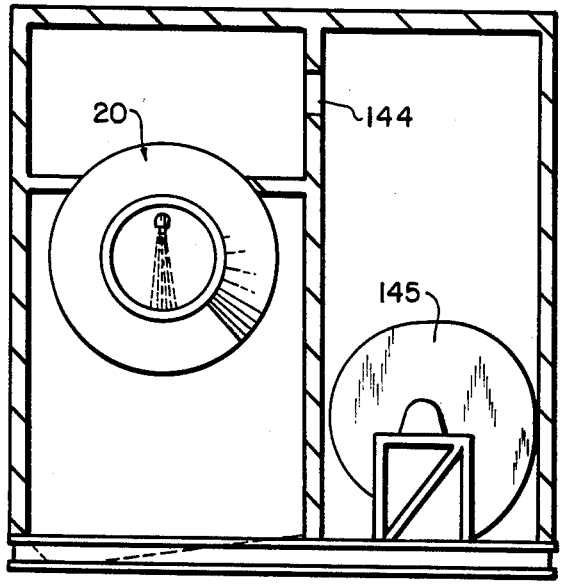
FIG. 7 is an expanded end view along line 7—7 of the cooler section of the roaster in FIG. 2.

The air quench, of, FIGS. 6 and 7, comprises an inlet for fresh make-up air 142 which joins a portion of the exhaust air, say 50%, as it recirculates through damper section 144 in the air cooler 22. The air enters a fan area 145 and is circulated through aperture 146 and thence through adjustable apertures 148 intermediate baffles 150, 152. The openings in apertures 148 are adjustable in the same manner as plates 72 and 74 in the heating zone. The cooling air is recirculated upwardly through foraminous cylinder 153 and the roasted whole bean bed contained therein exiting the cylinder wall 153 and exhausting in part through exhaust ports 154.

It will be noted that shaft 155 operates under control of the drive mechanism therefor and operates the assembly of means for advancing and discharging the coffee beans in the water quench section 20 and the air quench section 22.

It should also be noted that although mechanisms for driving shafts 52, 54 and shaft 155 operate independently, their speeds are related to one another to assure constant flow of beans through roaster zones 1 and 2 and the cooler sections 20 and 22.

Figure 9:
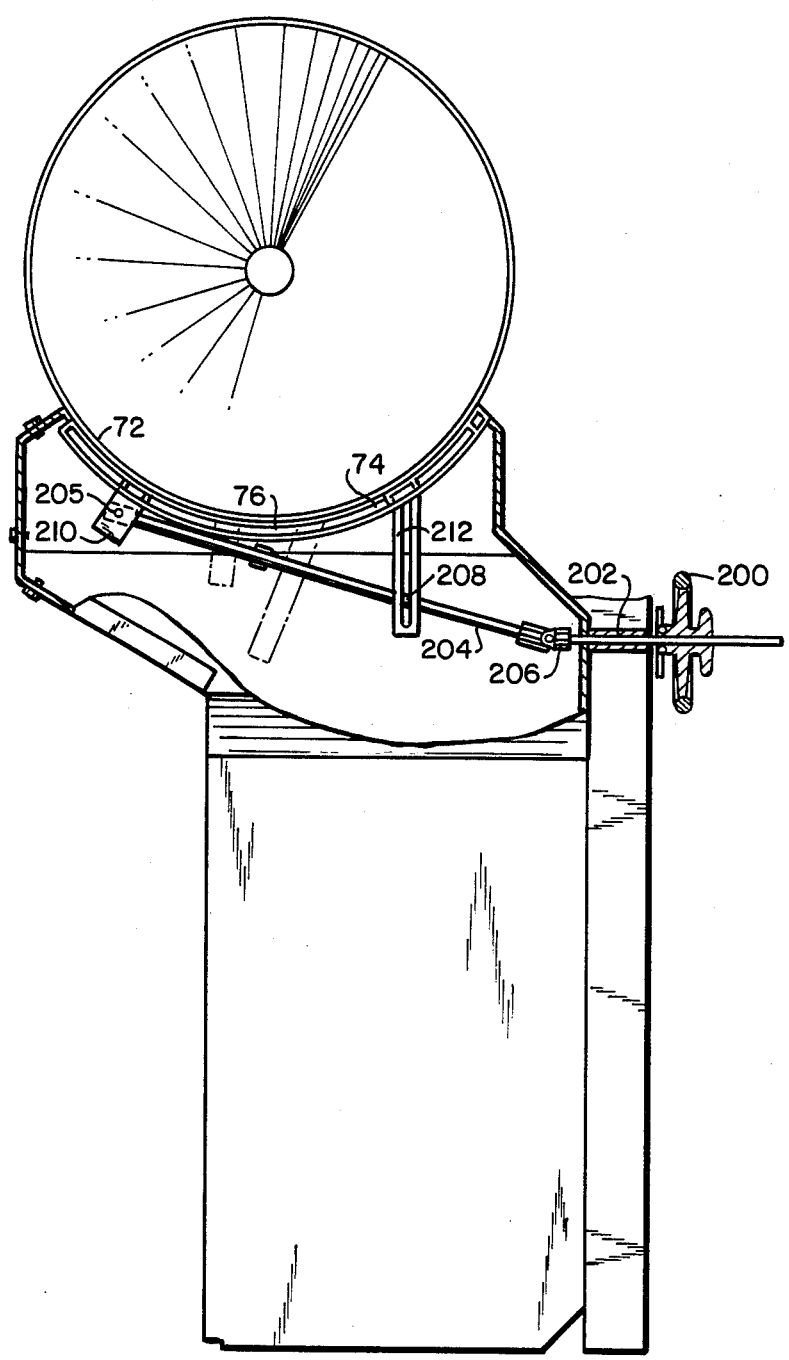
FIG. 9 is an expanded view of a portion of the roaster for adjusting the opening thereto and FIG. 10 is a further expanded view of a portion of the roaster in FIG. 9.
Figure 10:
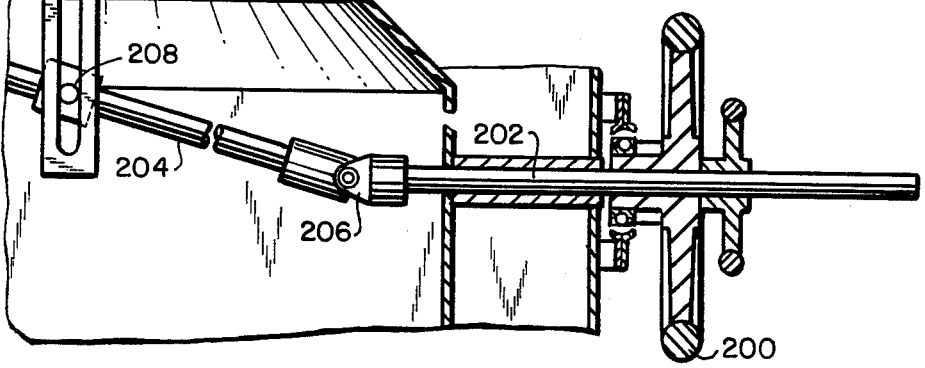

Means whereby adjustments are made in the width between plate means 72 and 74 through which heated air passes at 76 upwardly will be seen in FIGS. 9 and 10 as comprising manually operated wheels 200 each. As wheel means 200 is rotated, it in turn rotates shaft 202 which communicates with shaft 204 through intermediation of universal joint 206, whereby pin 208 rotatably mounted on shaft 204 and pin 205 on block means 210 may each move.

Pin 208 is adapted to move opposite pin 205 as each respective wheel 200 is rotated so that operation of wheels 200 causes pins 205 and 208 to move inwardly or outwardly. Each pin 208 and 205 slides in a slotted arm 212 and block means 210, respectively, whereby the plate gap 76 therebetween is adjusted in each roaster zone. A set of wheels 200 comprising 220 and 222 forms an adjustment unit for one gap 76. Adjusting one of two like means for each roasting cylinder 68 and 70 adjusts the gap settings for heated air spanning locations 220, 222; 224, 228; 230, 232; and 234 and 236. It will be appreciated that the gaps 76 between the plates 72 and 74 in each roaster will preferably be uniform, it having been found in common practice that the gap setting for the first and second heating zones may be substantially equal in providing access of the heated air to the coffee charge. Thus, movement of the wheels 220 and 222; 224 and 228; 230 and 232; and 234 and 236 as aforesaid provides the means for adjusting the openings through which air is admitted for heating purposes in the first and second roasters. Generally, the gap settings 76 will be at about 6 o'clock or at the lower-center of the arc between the plates 72 and 74. As stated the air flow in the gap 76 between plates 72 and 74 may vary. For a typical rotating structure such as is described and having a 43" diameter screw, the gaps in each zone will be at least 2", though it can be extended to as much as 20".

EXAMPLE 1

As may be drawn from the conditions set forth in Table 1 hereinbelow, Colombian, Brazilian, Ivory Coast Robustas and Central American Natural Milds coffees are roasted in the apparatus described, zones 1 and 2 thereof being each four foot long and have a 14 inch diameter in one set of experiments. The holes in the roasting cylinders are each 3/32" and spaced 9/64" on staggered centers, providing a 40% open area in the roasting chambers 10 and 12, the screw in each instance for zones 1 and 2 having a flight pitch of 7". In each roasting condition specified, the coffee was fed at a rate of 200 pounds/hour (green feed at a green moisture content of approximately 10%). Heated air was circulated through the first and second zones at 1225 cu. ft. per minute and at an air to bean ratio of 14:1 in each of Zones 1 and 2.

TABLE 1

| | GREEN COFFEE VARIETY (Non-Decaffeinated) | | | |
| --- | --- | --- | --- | --- |
| | Colombian | Brazilian | Ivory Coast Robustas | Central American Natural Milds |
| Internal Conditions ($\Delta p$)* Zone 1/Zone 2 | 0.75"/0.75" | 0.75"/0.75" | 0.75"/0.75" | 0.75"/0.75" |
| Cylinder Speed (RPM) Zone 1/Zone 2 | 10.0/15.4 | 13.5/22.2 | 11.5/21.8 | 12.0/22.2 |
| Temp (°F.) Entering Zone 1/Zone 2 | 600°/560° | 600°/560° | 600°/560° | 600°/560° |

TABLE 1-continued

| GREEN COFFEE VARIETY (Non-Decaffeinated) | | | | |
|---|---|---|---|---|
| | Colombian | Brazilian | Ivory Coast Robustas. | Central American Natural Milds |
| Static Bed Depth Zone 1/Zone 2 | 0.5"/0.7" | 0.4"/0.5" | 0.5"/0.5" | 0.5"/0.5" |
| Terminal Bed Depth At Discharge from Zone 2 | 4" | 4" | 4" | 4" |
| Roast Time Zone 1/Zone 2 | 40 sec/20 sec | 29 sec/18 sec | 35 sec/18 sec | 33 sec/18 sec |
| Air Quench Moisture After Zone 2/ final product moisture after a water and air quench at room temperature | 1.5%/4.5% | 1.5%/4.5% | 1.5%/4.5% | 1.5%/4.5% |
| Roasted Bean Density gm/cc | .310 | .301 | .336 | .295 |
| Roast Color Photovolts | 44 | 60 | 77 | 50 |

*The operating condition for each variety specify a delta p which represents the difference in pressure across (above and below) the bed measured as $P_2-P_1$, $\Delta p$ being a water pressure differential and being translatable to velocity and therefrom volume.

The coffees obtained by the processing conditions listed are each ground by passage through a NIPPON 201 FC Crackulator to produce an 11 ounce roast product. The higher yield, lower density coffees produced brewed products of excellent flavor, taste and aroma comparable to coffees brewed from the higher density, lower yield roasted and ground coffees representing the traditional coffee standard.

EXAMPLE 2

A larger plant scale-sized roaster which is capable of roasting 8,000 pounds of coffee per hour of the type described with reference to the accompanying drawings was also employed. The roaster employed for zones 1 and 2 respectively, each had a length of 15.3 feet and a diameter of 43 inches, the other conditions being as indicated for the 8 ft. roaster of Example 1 except that the holes for the roasting cylinder had a 50% open area and the screw in each instance had a flight pitch of 20 inches. The coffees were decaffeinated Colombians and Brazils in one experiment and decaffeinated Robustas in the other, the green coffee being fed in each instance at 8000 pounds per hour to the roaster. The air was passed through the first zone at 54,500 cu. ft. per minute with an air to bean ratio of 14:1. Air was circulated thorugh the second zone at 52,600 cu. ft. per minute with an air to bean ratio of 15:1.

TABLE 2

| DECAFFEINATED COLUMBIAN (A), BRAZILIAN (J) AND ROBUSTA (M) | | |
|---|---|---|
| | 50% A and 50% J | (M) |
| Internal Conditions ($\Delta p$) Zone 1/Zone 2 | 2.4"/2.2" | 2.4"/2.2" |
| Cylinder Speed (RPM) Zone 1/Zone 2 | 14.1/14.1 | 14.1/14.1 |
| Temp (°F.) Entering Zone 1/Zone 2 | 620°/520° | 616°/540° |
| Roast Time: Zone 1/Zone 2 | 30 sec/30 sec | 30 sec/30 sec |
| Final Product Moisture After Water and Air Quench | 4.9% | 4.9% |
| Roasted Bean Density gm/cc | .302 | .334 |
| Roast Color Photovolts | 34 | 40 |

*The operating condition for each variety specify a delta which represents the difference in pressure across (above and below) the bed measured as $P_2-P_1$, $\Delta p$ being a water pressure differential.

The blend of the first roast (constituting 50% A's and J's) and the second roast was formulated such that 30% of the first roast blend and 70% of the second blend (M) was prepared. The decaffeinated A and Js had a green density of 0.650 gms/cc and a moisture of 10.1% and the decaffeinated green Ms had a density of 0.707 gms/cc and a moisture of 11.2%. The roasted As and Js had a density of 0.302 gms/cc and the roasted Ms had a density of 0.334 gms/cc. The roast in each instance were popped in the second zone. The blended material was cracked (ground) through a commercial-scale Nippon mill (of the type set forth in U.S. Pat. No. 3,190,572 to Goto, issued June 22, 1965 for Coffee Granulating Apparatus which apparatus employs the Kasai method) No. GRN 6042. The gaps between the rolls of the Nippon mill were as follows from top to bottom of the mill: 1.16 mm., 0.66 mm., 0.18 mm. and 0.15 mm. The resulting ground density was 0.266 grams per cc in the can at the packing line. The ground coffee produces an 11 ounce blend that correlates quite favorably to that which would produce the standard 90 cups of a given strength from 16 oz. of conventional 16 oz roast.

The foregoing roasting conditions describe the roasting cylinder per se when it has achieved a steady state, the coffees being fed thereto at approximately 8,000 pounds per hour. As indicated, percolates from the ground coffee produced had a flavor strength and character comparable to that of a conventional atmospheric roast. This is a remarkable finding, considering the reduction in quantity of coffee material required to provide a given beverage. Thus, an original recipe (16 oz.) requiring 51.2 gms of coffee with 1780 mls. of water can now be prepared from an 11 oz product using 35.2 gms of coffee in a drip coffee brewer.

The degree of expansion as a result of roasting in accord with this invention will be broadly such that the volume occupied by the roasted blend will have 65%-85% of the weight of a conventional atmospheric roast (say a Probat-batch roaster), commonly much less than 85% of said weight; lower the percent the greater the expansion and the greater the economy of use. In conjunction with greater expension by this process comes a greater flavor concentration per weight of coffee such that the extended recipt will contain a flavor comparable to a conventionally roasted coffee. Of course, there is a practical limit beyond which the beans will not expand and also deliver the required flavor and strength without significantly altering roast color and blend. At a percentage reduction greater than 35% of the conventional roast, these conditions will not apply.

It should be recognized that a density increase in the roasted and ground coffee will occur after grinding due to conveying of coffee to the packaging line; typically in the order of 5%. In the examples cited, a final package density of 0.264 gms/cc was originally 0.251 gms/cc at the grinding mill. Generally the grinding may be carried out in a manner which preserves the density reduction of the whole beans achieved by roasting. A grinder that may be employed for this purpose is a Nippon 201 FC Crackulator. As a result of grinding to an average particle size between 700-800 microns, the finished gorund density will range from 0.240-0.310 gms/per cc at the mill as measured by free flow density techniques well understood in the art.

What is claimed is:

1. A method for roasting a high volume of from 5,000 to 12,000 pounds per hour of green coffee in a manner wherein the residence time of the coffee within the roaster is precisely controlled and is less than three minutes comprising the steps of:

(a) positively feeding green coffee beans into the feed end of a first, longitudinally extended roasting chamber, said roasting chamber comprising a first rotating, cylindrical foraminous container which rotates within said roasting chamber and a first helical screw member attached to and rotatable within said container, said screw member having a diameter equal to that of the container and effective to convey the coffee beans through the roasting chamber at a precise rate upon rotation, the coffee beans being fed into the container at a rate such that the depth of the coffee bed entering is substantially less than 50% of the diameter of the container;

(b) partially roasting the coffee beans within the first container for from 0.25 to 1.5 minutes while said beans are being subjected to a flow of heated gas which passes upwardly through the first foraminous container at a rate of at least 10 pounds of gas per pound of beans such that the hot gas causes an expansion of the advancing bean bed, the hot gas temperature being less than 630° F. and exceeding 500° F., whereby the beans are partly fluidized, partially dried and partially expanded but do not pop, the coffee beans increasing in their activity as they approach the terminal phase of the partial roast to a point whereat the beans are in a bubbling bed at a temperature exceeding 300° F. but do not exceed 400° F. bean temperature, the bean charge at no time being 100% fluidized, the depth of the partially expanded bed being at all times less than 50% of the diameter of the container;

(c) passing the partially roasted beans from the discharge end of the first roasting chamber into the feed end of a second longitudinally extending roasting chamber, the first and second roasting chambers being related one to another in a manner which prevent substantial escape of heated gas and beans from the roasting chambers;

(d) conveying said beans through said second roasting chamber by means of a second roasting, cylindrical foraminous container and a second helical screw member like the first, the coffee beans residing in said second roasting chamber for from 0.25 to 2.0 minutes while said beans are being subjected to a flow of heated gas which passes upwardly through the second foraminous container, said gas having a temperature equal to or less than that of the gas entering the first roasting chamber, said beans being heated to a temperature exceeding 360° F. but less than 480° F. and being more vigorously bubbled in the second roasting chamber than in the first roasting chamber along the length thereof by gas at a mass flow rate of at least about 10 pounds of gas per pound of beans and at least until the beans pop and have the requisite flavor and color developed therein, the bean charge at no time being 100% fluidized, and the temperature of the beans entering the second roaster being no less than 15° F. below the temperature thereof leaving the first roaster;

(e) passing the roasted coffee beans from the discharge end of the second roasting chamber into a quenching zone; and (f) quenching the roasted coffee in said zone with water and/or air to produce a roasted coffee with a whole bean density of from 0.28 to 0.34 g/cc.

2. The method of claim 1 wherein the total roasting time is less than 2.0 minutes, and the roasting time within the second roasting chamber is less than 1.5 minutes.

3. The method of claim 1 wherein the temperature of gas entering the second roasting chamber is no more than 150° F. less than that entering the first roasting chamber.

4. The method of claim 1 wherein the coffee is a single variety.

5. The method of claim 1 wherein the coffee is a blend of coffee varieties.

6. The method of claim 1 wherein the coffee is principally a Robusta and the gas temperature in said second roasting chamber is 25° to 125° F. less than that in the first chamber.

7. The method of claim 1 wherein the coffee is principally a Santos and the gas temperature in said second roasting chamber is 25° to 125° F. less than that in the first chamber.

8. The method of claim 1 wherein the coffee is principally Milds and the gas temperature in said second roasting chamber is 0° to 75° F. less than that in the first chamber.

9. The method of claim 2 wherein the temperature of gas in the first zone exceeds 525° F.

10. The method of claim 9 wherein the temperature of gas in the second zone is 25° F. or more less than that of the first zone and said beans are principally Robusta, Santos and blends thereof.

11. The method of claim 9 wherein the temperature of gas in the second zone is 0° to 75° F. less than that of the first zone and said beans are principally Milds.

12. The method of claim 1 wherein the coffee in the first and second chambers is subjected to a combined total mass flow rate of 20 to 60 pounds of gas per pound of beans.

13. The method of claim 12 wherein the roasted coffee is first charged to a water quench and thereafter is promptly fed to an air quench.

14. The method of claim 1 wherein roasted coffee particulate matter including roasted chaff is collected at the discharge end of the second roasting chamber and is recombined with the roasted coffee beans.

15. The method of claim 1 wherein the total roasting time from the point of entry to the first roasting chamber to the point of discharge from the second roasting chamber is less than 1.5 minutes and wherein the coffee is fed therealong at a constant rate as determined by the pitches and the rotational speed of the first and second zones' screws.

16. The method of claim 1 wherein the beans in the first roasting chamber reach a temperature exceeding 300° F. but less than 375° F., and wherein the beans enters the second roasting chamber are further exposed to gas at a temperature equal to or less than that in the first roaster whereby controlled pyrolysis occurs in the second roasting chamber generating coffee flavor, color and bean expansion.

17. The method of claim 16 wherein the gas temperature in the first roasting chamber exceeds 500° F. and the gas temperature in the second roasting chamber is 0°–125° F. below that in the first roasting chamber.

18. The method of claim 1 wherein the beans are heated in the second roasting chamber to a temperature that is between 365°–450° F.

19. The method of claim 18 wherein the beans are elevated in the second roasting chamber to a temperature not exceeding substantially the glass transition temperature and are maintained thereat for less than 30 seconds.

20. The method of claim 1 wherein the gas temperatures in the first roasting chamber are from 500° to 630° F. and in the second roasting chamber are from 460° to 570° F.

21. The method of claim 20 wherein the gas temperature in the first roasting chamber is 560°–610° F.

22. The method of claim 1 wherein at least 20% of the bed fluidizes in the first roasting chamber and wherein at least 50% of the bed fluidizes in the second roasting chamber.

23. The method of claim 22 wherein the beans are introduced to the first roasting chamber at a rate such that the beans are less than five inches in height when they enter in a quiescent state.

24. The method of claim 1 wherein the coffee exits the first roaster at 0.5–4% moisture.

25. The method of claim 1 wherein two or more coffee varieties to be roasted are blended after roasting and wherein the individual coffee varieties are separately roasted to their optimal colors, said varieties being Robusta, Santos, Milds and blends thereof.

26. The method of claim 1 wherein the coffee to be produced is blended before being roasted.

27. The method of claim 1 wherein the coffee comprises a blend of non-decaffeinated Robustas, Santos and Milds, the Robustas being roasted to a color of 70–90, Milds 40–60, and Santos to 50–70 photovolts.

28. The method of claim 1 wherein the coffee comprises a decaffeinated coffee or blend of decaffeinated coffees roasted to a color of 30 to 60 photovolts.

* * * * *